(12) United States Patent
Nair

(10) Patent No.: US 9,088,197 B2
(45) Date of Patent: Jul. 21, 2015

(54) SHAFT GROUNDING SYSTEM

(75) Inventor: Purushothaman Sasidharan Nair, Secunderabad (IN)

(73) Assignee: General Electric Company, Schenectady, NY (US)

( * ) Notice: Subject to any disclaimer, the term of this patent is extended or adjusted under 35 U.S.C. 154(b) by 600 days.

(21) Appl. No.: 13/227,193

(22) Filed: Sep. 7, 2011

(65) Prior Publication Data

US 2013/0057108 A1   Mar. 7, 2013

(51) Int. Cl.
| | |
|---|---|
| *H02K 13/00* | (2006.01) |
| *H02K 11/00* | (2006.01) |
| *H01R 39/64* | (2006.01) |
| *H02K 5/173* | (2006.01) |

(52) U.S. Cl.
CPC .......... *H02K 11/0089* (2013.01); *H01R 39/646* (2013.01); *H02K 5/1732* (2013.01); *Y02E 20/16* (2013.01)

(58) Field of Classification Search
CPC   H02K 13/105; H02K 11/028; H02K 11/0089
USPC .................................................. 310/219–222
See application file for complete search history.

(56) References Cited

U.S. PATENT DOCUMENTS

| | | | |
|---|---|---|---|
| 4,661,734 A * | 4/1987 | Capuano et al. ................. 310/89 |
| 4,746,297 A * | 5/1988 | Soleau .............................. 439/8 |
| 4,801,270 A | 1/1989 | Scarlata |
| 4,831,295 A * | 5/1989 | Posedel ........................... 310/72 |
| 4,873,512 A | 10/1989 | Miller |
| 4,954,084 A | 9/1990 | Pugh et al. |
| 5,227,950 A | 7/1993 | Twerdochlib |
| 5,914,547 A * | 6/1999 | Barahia et al. .................. 310/71 |
| 6,093,986 A * | 7/2000 | Windhorn .................... 310/68 B |
| 6,608,410 B2 | 8/2003 | Sato et al. |
| 6,670,733 B2 * | 12/2003 | Melfi .......................... 310/68 R |
| 7,193,836 B2 * | 3/2007 | Oh et al. ........................ 361/220 |
| 7,339,777 B2 | 3/2008 | Barnard et al. |
| 7,649,470 B2 * | 1/2010 | Hobelsberger et al. ........ 340/679 |
| 7,830,031 B2 * | 11/2010 | Helle et al. ....................... 290/44 |
| 2005/0062350 A1 | 3/2005 | Kuo et al. |

FOREIGN PATENT DOCUMENTS

WO      WO 0069062 A1 *  11/2000

* cited by examiner

*Primary Examiner* — Naishadh Desai
(74) *Attorney, Agent, or Firm* — Catherine Toppin; Hoffman Warnick LLC

(57) ABSTRACT

Systems for grounding components in a machine are disclosed. In one embodiment, a system includes: an inner component configured to be connected to a shaft; a ground component configured to be disposed substantially about the inner component, the ground component configured to complement the inner component and substantially define a cavity there between; and a conductive substance disposed within the cavity substantially between the inner component and the ground component, the conductive substance configured to electrically connect the inner component and the ground component.

14 Claims, 5 Drawing Sheets

SHAFT GROUNDING SYSTEM

BACKGROUND OF THE INVENTION

The subject matter disclosed herein relates to machine shafts and, more particularly, to a system for electrically grounding rotating shafts in machines, particularly dynamoelectric machines.

Some machines (e.g., dynamoelectric machines, generators, alternating current motors, direct current motors etc.) and/or apparatuses, employ rotary shafts in their design and operation. These rotary shafts may be physically connected to portions of the machine and supported by bearings. In operation, some of these shafts may develop and/or receive unwanted electrical voltages. These voltages may discharge from the shaft through portions of the machine (e.g., bearings), causing fusion craters, severe pitting, fluting damage, bearing failure, etc. Therefore, it is desirable to preemptively dissipate and/or release these unwanted electrical voltages in a controlled manner, thereby avoiding damage to machine components. Some machines use grounded brush seals and/or carbon fibers disposed around and physically in contact with the rotary shaft to ground the unwanted electrical voltages. These systems are machined to fit precisely about the shaft and include conductive elements which are physically in contact with both the rotating shaft and an electrically grounded component. However, these systems may require special machining to attain a proper fit, and as a result of the requisite physical contact may wear, degrade, produce dust and generate sparks during operation.

BRIEF DESCRIPTION OF THE INVENTION

Systems for electrically grounding a shaft are disclosed. In one embodiment, a system includes: an inner component configured to be connected to a shaft; a ground component configured to be disposed substantially about the inner component, the ground component configured to complement the inner component and substantially define a cavity there between; and a conductive substance disposed within the cavity substantially between the inner component and the ground component, the conductive substance configured to electrically connect the inner component and the ground component.

A first aspect of the invention provides a system including: an inner component configured to be connected to a shaft; a ground component configured to be disposed substantially about the inner component, the ground component configured to complement the inner component and substantially define a cavity there between; and a conductive substance disposed within the cavity substantially between the inner component and the ground component, the conductive substance configured to electrically connect the inner component and the ground component.

A second aspect provides a dynamoelectric machine including: a stator; a rotor disposed substantially within the stator, the rotor including a shaft; and a grounding system disposed circumferentially about a portion of the shaft, the grounding system comprising: an inner component configured to be connected to a shaft; a ground component configured to be disposed substantially about the inner component, the ground component configured to complement the inner component and substantially define a cavity there between; and a conductive substance disposed within the cavity substantially between the inner component and the ground component, the conductive substance configured to electrically connect the inner component and the ground component.

A third aspect provides a power generation system including: a turbine; a generator operatively connected to the turbine, the generator including a shaft; and a grounding system disposed circumferentially about a portion of the shaft, the grounding system comprising: an inner component configured to be connected to a shaft; a ground component configured to be disposed substantially about the inner component, the ground component configured to complement the inner component and substantially define a cavity there between; and a conductive substance disposed within the cavity substantially between the inner component and the ground component, the conductive substance configured to electrically connect the inner component and the ground component.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
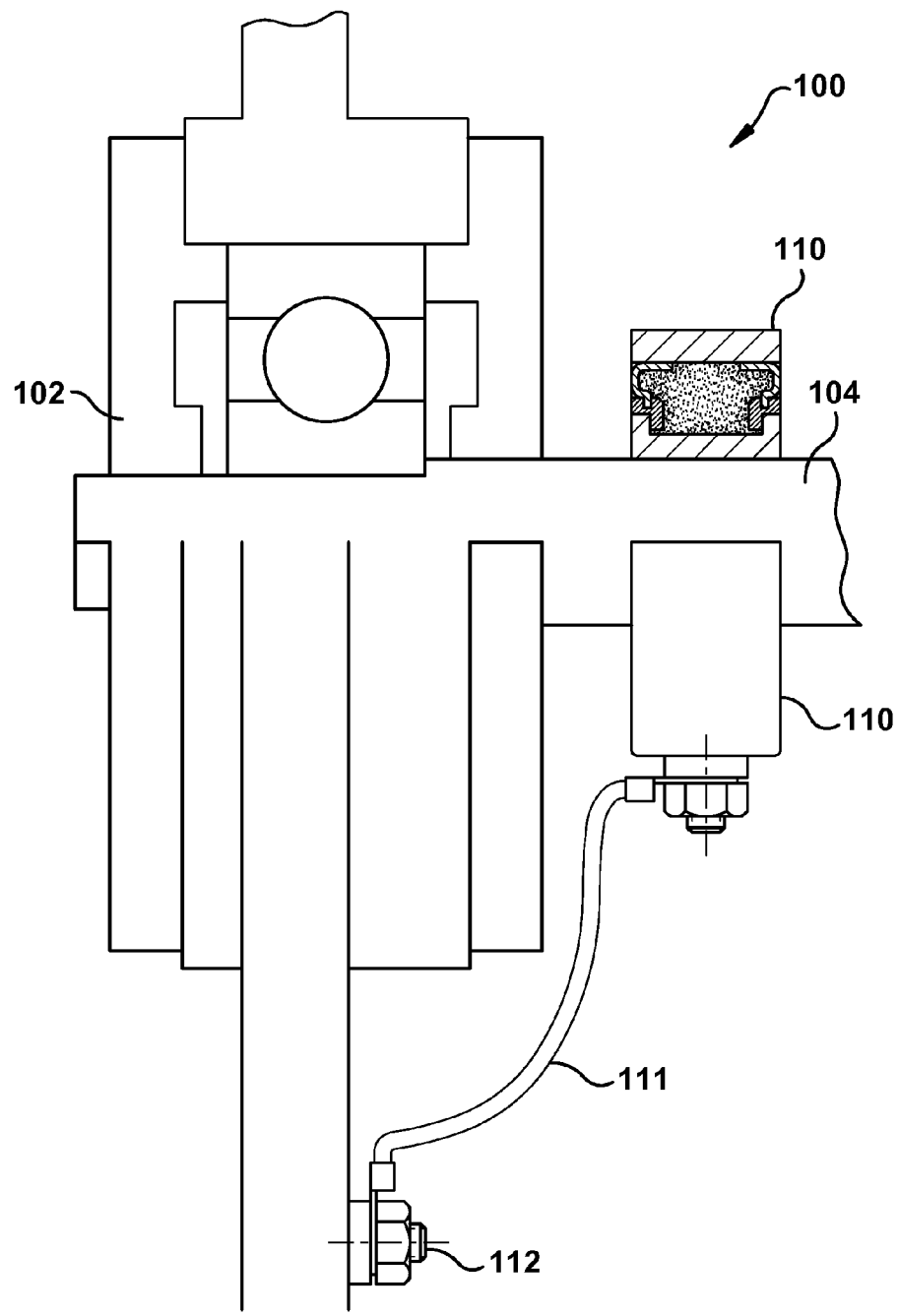
FIG. 1 shows a partial cross-sectional view of portions of a machine in accordance with aspects of the invention.

It is noted that the drawings of the disclosure may not necessarily be to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated herein, aspects of the invention provide for systems configured to electrically ground rotating components in a machine, (for example, e.g. a driving machine, a dynamoelectric machine, an alternating current motor, a generator, a direct current motor, a gas turbine, a steam turbine, a compressor, etc.). These systems include an inner component which is disposed about a shaft of the machine and is electrically connected to a complementary ground component via a conductive substance (e.g., fluid, grease, gel, carbon powder, graphite powder etc.), thereby dissipating/grounding unwanted currents from the shaft to ground via the grounded component.

The operation of some machines and/or systems (including, e.g., generators, alternating current motors, direct current motors, etc.), may induce harmful electrical voltages in the shafts of these machines. These harmful voltages may discharge through the machine and cause component damage such as craters, pitting, fluting, component failure, etc. Some systems use grounded brush seals or carbon fibers which are physically connected to the shaft during operation to dissipate these harmful voltages. However, during operation these dissipation systems may produce dust, generate sparks, wear on the machine components, and require continuous monitoring.

In contrast to the conventional system, embodiments of the current invention provide for a system which electrically grounds a rotating shaft without producing dust, sparks or wear on machine components. The system includes an inner component which is disposed substantially about and physically connected to the rotating shaft. The inner component is electrically connected, via a conductive substance and/or fluid, to a ground component which is configured to complement the inner component. The ground component and inner component are configured relative one another so as to substantially define a cavity between the ground component and the inner component which contains the conductive fluid. During operation, the inner component may rotate with the shaft and remain electrically connected to the ground component via the conductive fluid. Thus, harmful voltages that develop or accumulate on the shaft, may be safely discharged to the ground component through the conductive fluid before attaining a level that may be harmful to machine components.

Turning to the FIGURES, embodiments of a grounding system for a machine such as a generator are shown, where the grounding system may allow for increases in efficiency and life expectancy of the bearings, components, shafts and the overall machine, by grounding harmful electrical voltages while reducing physical contact with the rotating shaft. Specifically, referring to FIG. 1, a partial cross-sectional view of portions of a machine 100 in accordance with an aspect of the invention is shown. Machine 100 may include a shaft 104 operably connected to a motor 102 and electrically connected to a grounding system 110. In operation, motor 102 may rotate and/or operate shaft 104, which may induce or cause the accumulation of harmful electrical voltages within shaft 104. These harmful electrical voltages are conveyed from shaft 104 to grounding system 110, which is physically connected to a grounded surface 112 via a wire 111. Grounding system 110 dissipates these received electrical voltages to ground 112 via wire 111. In one embodiment, grounding system 110 is physically connected to a portion of shaft 104. In another embodiment, grounding system 110 is configured circumferentially about a portion of shaft 104. In one embodiment, grounding system 110 has a substantially annular shape.

Figure 2:
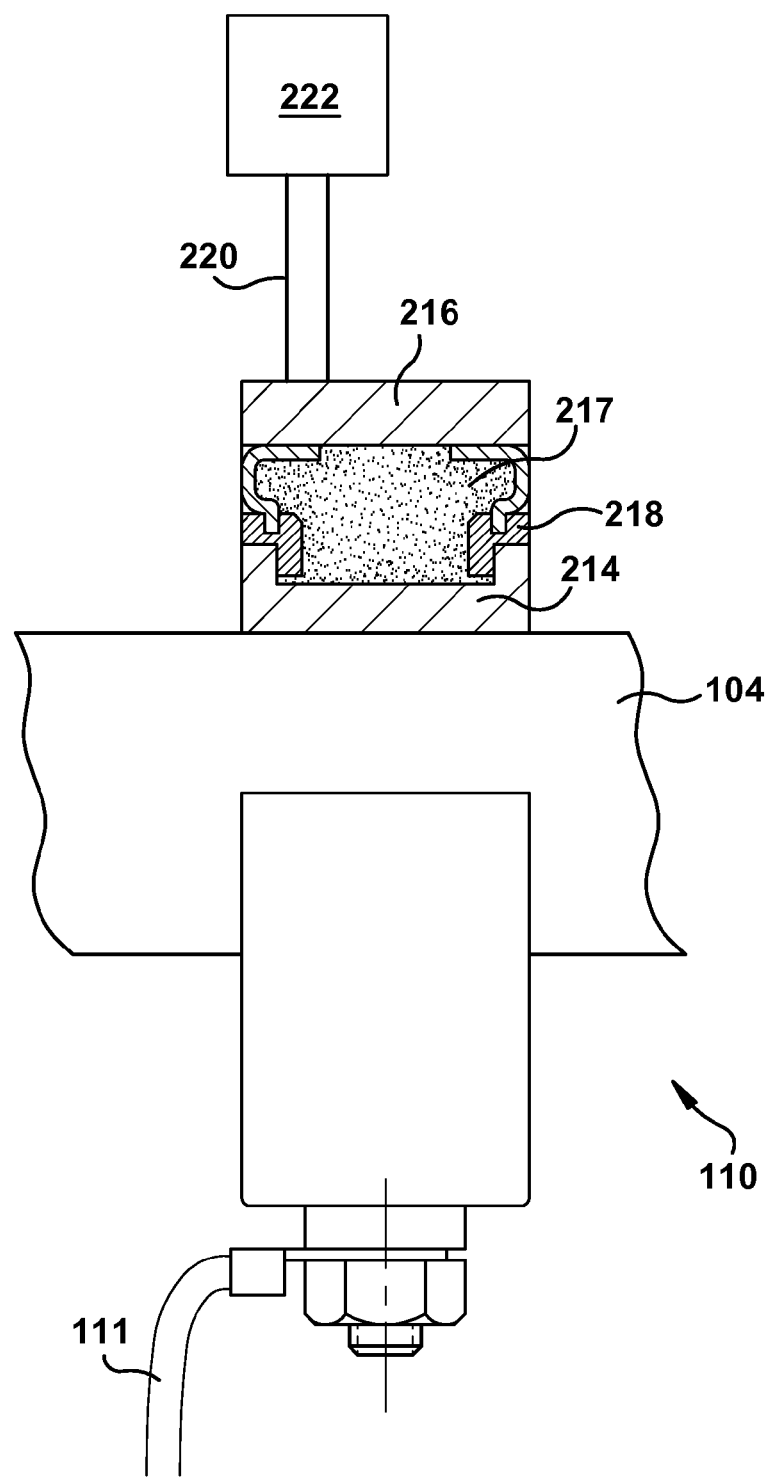
FIG. 2 shows a partial cross-sectional view of portions of a grounding system in accordance with aspects of the invention.

Turning to FIG. 2, a partial cross-sectional view of portions of a grounding system 110 is shown according to embodiments of the invention. It is understood that in embodiments shown and described with reference to FIGS. 2-5, like numbering may represent like elements and that redundant explanation of these elements has been omitted for clarity. Finally, it is understood that the components of FIGS. 1-5 and their accompanying descriptions may be applied to any embodiment described herein. Returning to FIG. 2, in this embodiment, grounding system 110 may include a ground component 216 configured substantially about an inner component 214 which may be configured to be disposed upon shaft 104. It is understood that attachment of inner component 214 upon shaft 104 may be accomplished in any number of ways (e.g., welding, shrink fit, riveting, etc.) as is known in the art or discussed further below. In this embodiment, inner component 214 is physically connected to shaft 104, such that rotation of shaft 104 substantially rotates inner component 214. In one embodiment, inner component 214 is integral to shaft 104. In another embodiment, inner component 214 may have a ring shape. In another embodiment, inner component 214 may have an irregular shape. In one embodiment, ground component 216 may be configured to be disposed circumferentially about both inner component 214 and a portion of shaft 104. In any event, ground component 216 is complementary to inner component 214 and configured in substantial proximity to inner component 214 so as to substantially define a cavity 217 there between ground component 216 and inner component 214. In one embodiment, ground component 216 and inner component 214 may be physically independent of one another. In one embodiment, ground component 216 and inner component 214 may be configured to maintain a physical clearance there between one another. In another embodiment, ground component 216 and inner component 214 may physically contact one another. In one embodiment, a conductive substance may be disposed within cavity 217, thereby electrically connecting inner component 214 and ground component 216. In one embodiment the conductive substance may be a solid conductive lubricant (e.g., carbon powder, graphite powder, etc.). In another embodiment, the conductive substance may be a conductive fluid (e.g., grease, oil, lubricant, etc.). In one embodiment, the conductive fluid substantially fills cavity 217 such that inner component 214 and ground component 216 are in substantially continuous electrical contact.

In an embodiment of the present invention, a seal 218 may be disposed between inner component 214 and ground component 216. Seal 218 further defining cavity 217 and substantially sealing the conductive substance between inner component 214 and ground component 216. It is understood that seal 218 may comprise any kind of seal as is known, such as an overlap seal, a labyrinth seal, etc.

In another embodiment, grounding system 110 includes a sensor 222 which is operably connected to ground component 216 via a wire 220. Sensor 222 may be configured to measure at least one of: a current in the shaft, a voltage in the shaft, a temperature of the shaft, a temperature of the inner component, or a temperature of the electrically conductive fluid.

Figure 3:
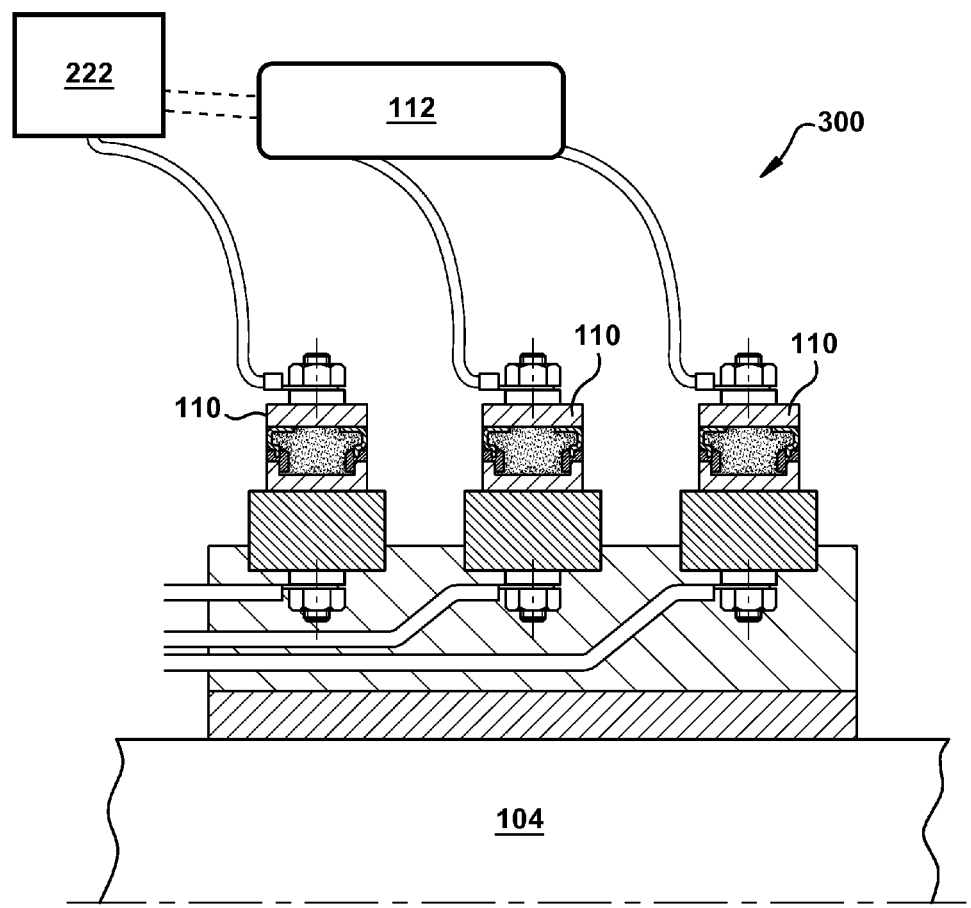
FIG. 3 shows a partial cross-sectional view of portions of a grounding system assembly in accordance with aspects of the invention.

Turning to FIG. 3, a partial cross-sectional view of portions of a grounding system assembly 300 is shown according to embodiments of the invention. In this embodiment, grounding system assembly 300 includes a plurality of grounding systems 110 which are connected to a shaft 104. In one embodiment, sensor 222 may be operably connected to a grounding system 110 to obtain data readings from shaft 104. A grounded surface 112 may be electrically connected to remaining grounding systems 110 to dissipate electrical currents from shaft 104. In another embodiment, each grounding system 110 may dissipate currents from shaft 104 and be connected to sensor 222 such that each grounding system 110 obtains data readings from shaft 104 via sensor 222. Thus, each grounding system 110 dissipates a specific area of shaft 104 and obtains location specific data readings of shaft 104.

Figure 4:
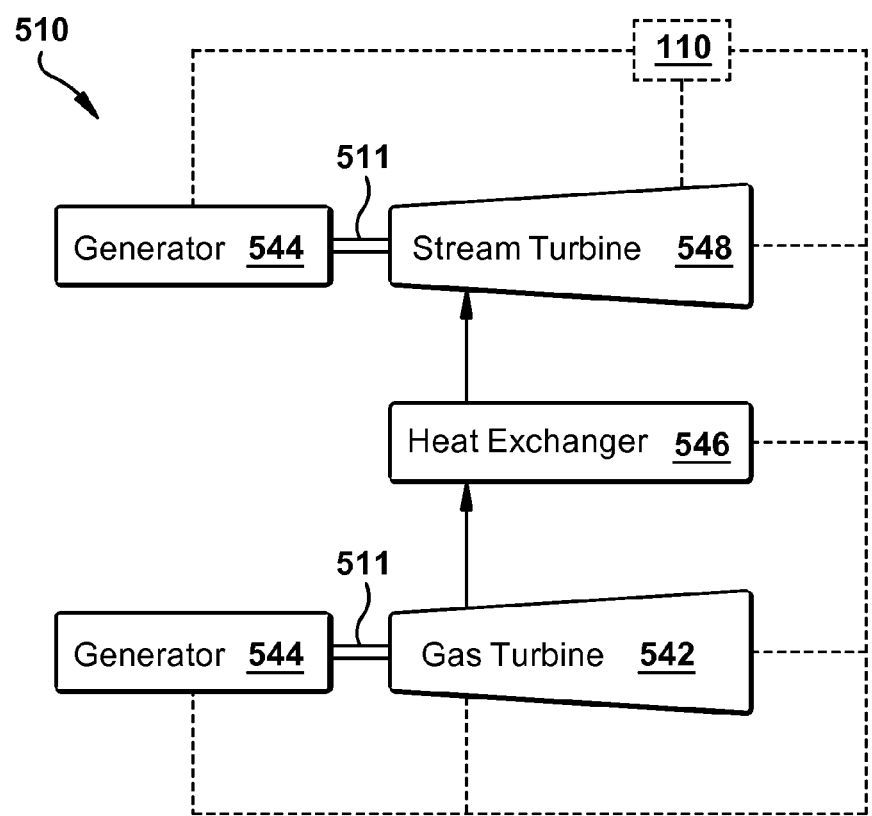
FIG. 4 shows a schematic view of an embodiment of portions of a multi-shaft combined cycle power plant in accordance with an aspect of the invention.
Figure 5:
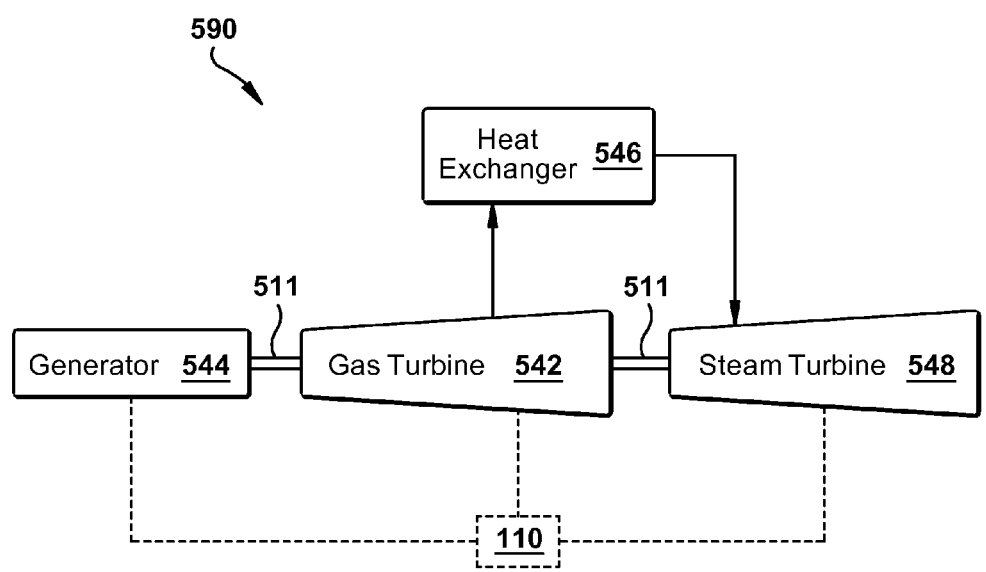
FIG. 5 shows a schematic view of an embodiment of a single shaft combined cycle power plant in accordance with an aspect of the invention.

Turning to FIG. 4, a schematic view of portions of a power generation system, multi-shaft combined-cycle power plant 510 is shown. Combined-cycle power plant 510 may include, for example, a gas turbine 542 operably connected to a generator 544. Generator 544 and gas turbine 542 may be mechanically coupled by a shaft 511, which may transfer energy between a drive shaft (not shown) of gas turbine 542 and generator 544. Generator 544 and/or shaft 511 may be operably connected to grounding system 110 of FIG. 1 or other embodiments described herein. Also shown in FIG. 4 is a heat exchanger 546 operably connected to gas turbine 542 and a steam turbine 548. Heat exchanger 546 may be fluidly connected to both gas turbine 542 and steam turbine 548 via conventional conduits (numbering omitted). Heat exchanger 546 may be a conventional heat recovery steam generator (HRSG), such as those used in conventional combined-cycle power systems. As is known in the art of power generation, HRSG 546 may use hot exhaust from gas turbine 542, combined with a water supply, to create steam which is fed to steam turbine 548. Steam turbine 548 may optionally be coupled to a second generator system 544 (via a second shaft 511). It is understood that generators 544 and shafts 511 may be of any size or type known in the art and may differ depending upon their application or the system to which they are connected. Common numbering of the generators and shafts is for clarity and does not necessarily suggest these generators or shafts are identical. Generator system 544 and second shaft 511 may operate substantially similarly to generator system 544 and shaft 511 described above, and further may also be operably connected to grounding system 110 of FIG. 1 or other embodiments described herein. Steam turbine 548 may be fluidly connected to grounding system 110 of FIG. 1 or other embodiments described herein. In another embodiment, shown in FIG. 5, a single-shaft combined-cycle power plant 590 may include a single generator 544 coupled to both gas turbine 542 and steam turbine 546 via a single shaft 511. Single generator 544 and single shaft 511 may be fluidly connected to grounding system 110 of FIG. 1 or other embodiments described herein.

The grounding system of the present disclosure is not limited to any one particular machine, driven machine, turbine, fan, blower, compressor, power generation system or other system, and may be used with other power generation systems and/or systems (e.g., combined-cycle, simple-cycle, nuclear reactor, etc.). Additionally, the grounding system of the present invention may be used with other systems not described herein that may benefit from the electrical dissipation/grounding/release capabilities of the grounding system described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
    a plurality of grounding systems, each of the plurality of grounding systems being disposed circumferentially about a respective portion of a shaft, wherein each of the plurality of grounding systems includes:
    an inner component configured to be physically connected to and disposed radially about the shaft,
    a ground component configured to be disposed substantially radially about the shaft and the inner component, the ground component configured to complement the inner component and define a substantially annular cavity positioned radially therebetween, and
    a conductive substance disposed within the substantially annular cavity between a radially outer surface of the inner component and a radially inner surface of the ground component, the conductive substance configured to electrically connect the inner component and the ground component; and
    a sensor operatively connected to the ground component of each of the plurality of grounding systems, the sensor configured to measure, at each of the respective portions of the shaft, at least one of a temperature of an inner component of one of the plurality of grounding systems, or a temperature of a conductive substance of one of the plurality of grounding systems.

2. The system of claim 1, wherein the inner component is configured to be disposed circumferentially about a portion of the shaft.

3. The system of claim 1, wherein the inner component is configured to rotate with the shaft.

4. The system of claim 1, further compromising a seal configured between the inner component and the ground component, the seal further defining the cavity.

5. The system of claim 1, wherein the conductive substance is one of carbon powder and graphite powder.

6. A dynamoelectric machine comprising:
    a stator;
    a rotor disposed substantially within the stator, the rotor including a shaft; and
    a plurality of grounding systems, each of the plurality of grounding systems being disposed circumferentially about a respective portion of the shaft, wherein each of the plurality of grounding systems includes:
    an inner component configured to be connected to and disposed radially about the shaft,
    a ground component configured to be disposed substantially radially about the shaft and the inner component, the ground component configured to complement the inner component and define a substantially annular cavity positioned radially therebetween, and
    a conductive substance disposed within the substantially annular cavity between a radially outer surface of the inner component and a radially inner surface of the ground component, the conductive substance configured to electrically connect the inner component and the ground component; and
    a sensor operatively connected to the ground component of each of the plurality of grounding systems, the sensor configured to measure, at each of the respective portions of the shaft, at least one of a temperature of an inner component of one of the plurality of grounding systems, or a temperature of a conductive substance of one of the plurality of grounding systems.

7. The dynamoelectric machine of claim 6, wherein the inner component is configured to be disposed circumferentially about a portion of the shaft.

8. The dynamoelectric machine of claim 6, wherein the inner component is configured to rotate with the shaft.

9. The dynamoelectric machine of claim 6, further compromising a seal configured between the inner component and the ground component, the seal further defining the cavity.

10. The dynamoelectric machine of claim 6, wherein the conductive substance is one of carbon powder and graphite powder.

11. A power generation system comprising:
    a turbine;
    a generator operatively connected to the turbine, the generator including a shaft; and
    a plurality of grounding systems, each of the plurality of grounding systems being disposed circumferentially about a respective portion of the shaft, wherein each of the plurality of grounding systems includes:

an inner component configured to be connected to and disposed radially about the shaft, a ground component configured to be disposed substantially radially about the shaft and the inner component, the ground component configured to complement the inner component and define a substantially annular cavity positioned radially therebetween, and a conductive substance disposed within the substantially annular cavity between a radially outer surface of the inner component and a radially inner surface of the ground component, the conductive substance configured to electrically connect the inner component and the ground component; and a sensor operatively connected to the ground component of each of the plurality of grounding systems, the sensor configured to measure, at each of the respective portions of the shaft, at least one of a temperature of an inner component of one of the plurality of grounding systems, or a temperature of a conductive substance of one of the plurality of grounding systems.

12. The power generation system of claim 11, wherein the inner component is configured to rotate with the shaft.

13. The power generation system of claim 11, further compromising a seal configured between the inner component and the ground component, the seal further defining the cavity.

14. The power generation system of claim 11, wherein the conductive substance is one of carbon powder and graphite powder.

* * * * *